United States Patent [19]

Kieronski

[11] Patent Number: 4,820,086
[45] Date of Patent: Apr. 11, 1989

[54] PNEUMATIC TUBE CARRIER SYSTEM AND METHOD

[75] Inventor: John P. Kieronski, Charlotte, N.C.

[73] Assignee: Donald R. Gilreath, Concord, N.C.

[21] Appl. No.: 888

[22] Filed: Jan. 6, 1987

[51] Int. Cl.⁴ ............................................. B65G 51/26
[52] U.S. Cl. ................................... 406/112; 406/189; 406/74; 220/230
[58] Field of Search ................. 406/110–112, 406/184–190, 74, 182; 220/230; 414/411

[56] References Cited

U.S. PATENT DOCUMENTS

| | | | |
|---|---|---|---|
| 1,184,222 | 7/1931 | Morehouse | 91/16 |
| 3,189,297 | 6/1965 | Ellithorpe | 406/111 |
| 3,237,881 | 3/1966 | Grosswiller, Jr. et al. | 406/19 |
| 3,612,438 | 10/1971 | Herndon | 406/190 |
| 3,655,146 | 4/1972 | Woll | 406/188 |
| 3,788,577 | 1/1974 | Barnett et al. | 406/188 |
| 3,961,721 | 6/1976 | Gordon et al. | 220/230 |
| 4,180,354 | 12/1979 | Greene | 406/112 |
| 4,189,261 | 2/1980 | Kelley et al. | 406/112 |
| 4,325,660 | 4/1982 | Jones | 406/84 |
| 4,395,164 | 6/1983 | Beltrop et al. | 406/74 |
| 4,466,761 | 8/1984 | Beltrop et al. | 406/74 |
| 4,512,688 | 4/1985 | Hochradel | 406/111 |
| 4,620,577 | 11/1986 | Nordenswan | 406/111 X |

Primary Examiner—Sherman D. Basinger
Assistant Examiner—Paul E. Salmon
Attorney, Agent, or Firm—Shefte, Pinckney & Sawyer

[57] ABSTRACT

A pneumatic tube carrier system (10) includes a first carrier receiving and sending terminal (11) and a second carrier receiving and sending terminal (13). A carrier (20) is transported back and forth between the terminals (11,13) through a pneumatic tube (12) interconnecting the first and second terminals. Means are operatively associated with at least one of the first and second terminals for automatically removing contents from the carrier at the at least one terminal before returning the carrier to the other terminal. A cover (30) is held on the carrier by magnetic attraction and without hinges or latches.

18 Claims, 10 Drawing Sheets

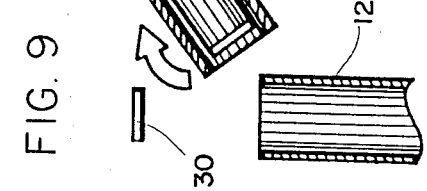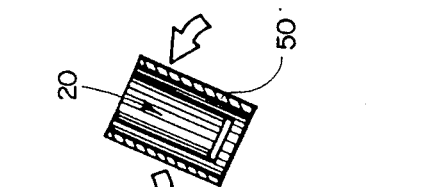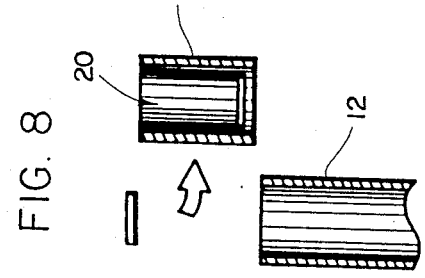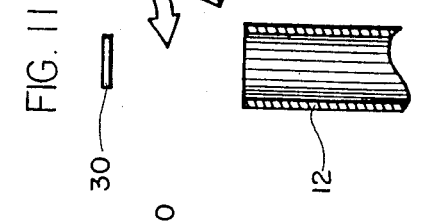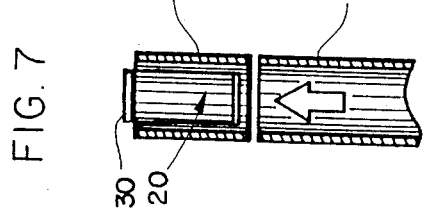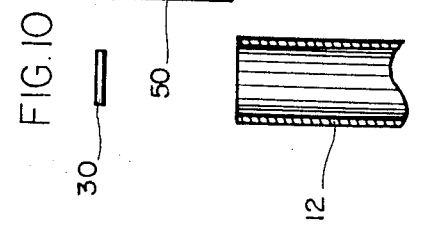

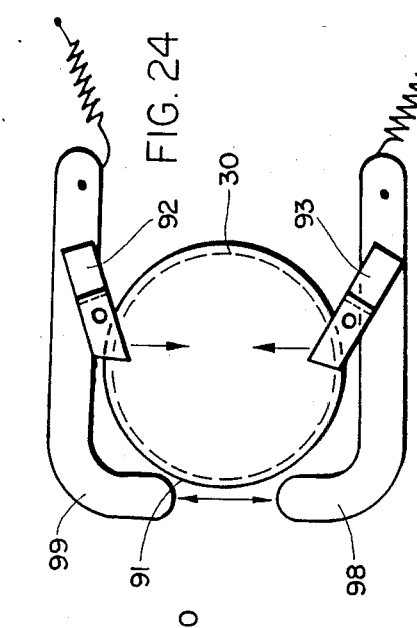
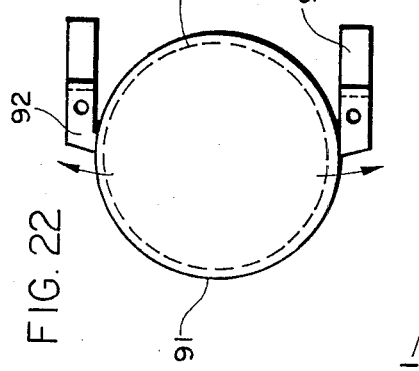
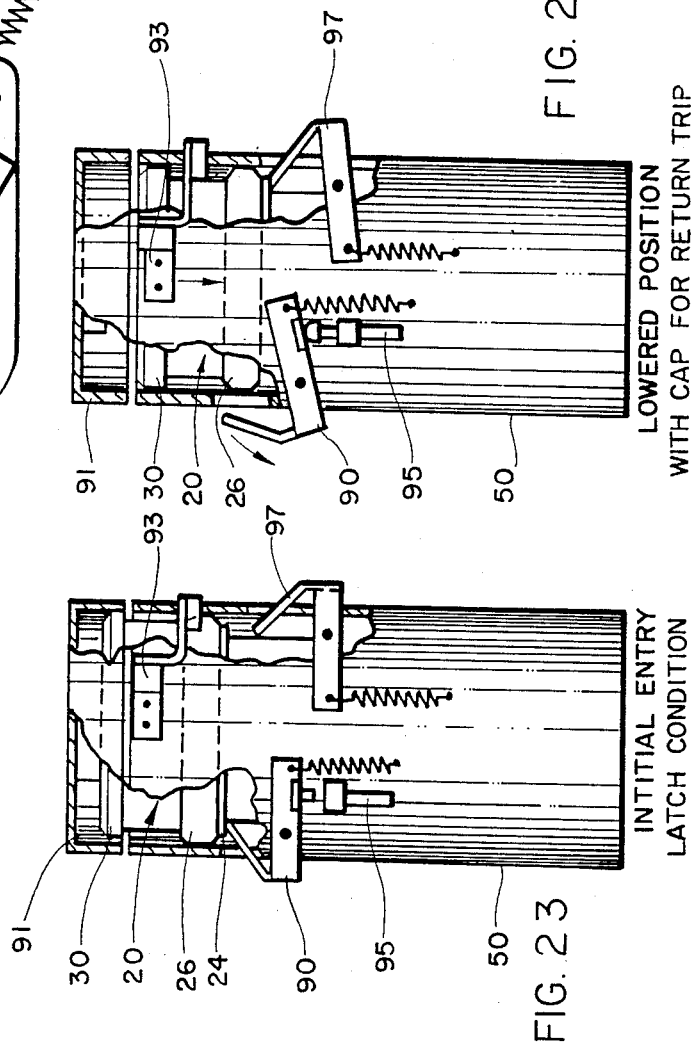

PNEUMATIC TUBE CARRIER SYSTEM AND METHOD

TECHNICAL FIELD AND BACKGROUND OF INVENTION

This invention relates to a pneumatic tube carrier of the type which may be used to carry objects, such as mail and newspapers from outside to inside a building. The particular embodiment disclosed in this application relates to a system designed to function in a residential environment. The outside terminal serves as a mailbox and in the disclosure below is operated manually by the postman in much the same way a regular mailbox would be operated. The inside terminal is designed to be operated automatically or semiautomatically.

Pneumatic carrier systems are known in the prior art and have heretofore been used primarily in banks and savings and loans to permit transactions to take place between a customer—usually in a car—and an employee of the bank or savings and loan stationed inside the building. Such systems are manual in the sense that the transaction takes place by the customer removing a carrier from a terminal and manually opening it, placing money, checks or the like in the carrier, closing the carrier, placing the carrier back in the terminal and activating the system by closing a door, pushing a button, etc. The carrier travels through a pneumatic tube to the employee who removes the carrier from the inside terminal, manually opens the carrier, removes the contents, carries out the desired transaction, places documentation such as a deposit slip or other contents in the carrier, closes the carrier, places the carrier back in the inside terminal, and activates the system, sending the carrier back to the customer, who carries out the same steps all over again to remove the items from the carrier. This system requires a person on both ends who must carry out a series of steps in the correct order for the system to work properly.

This type of system is suitable only for fully attended use, as described above. Such a system is completely impractical for use in a residential environment since the occupant of the residence and the postman or newspaper carrier would seldom, if ever, be at opposite ends of the system at the same time. In addition, the manual systems currently in use cannot be used for unattended automatic or semiautomatic use in financial institutions after regular business hours or when an attendant is not needed as a part of a transaction, i.e., making a deposit.

A manual system is also not practical for other commercial or for industrial because a person must be almost constantly in attendance at one or both ends to remove contents and dispatch the carrier. An automatic system would be an ideal manner of transmitting plans, drawings and even manufacturing parts and supplies from one part of a large industrial area to another.

A number of problems have heretofore prevented development of a practical automatic pneumatic carrier system. These include the need for a carrier which will travel in any direction in the system and yet be capable of being manually loaded and manually or automatically unloaded, the need for a system with means for accumulating contents unloaded over a period of time and the need for a system which requires only one blower located remote from the terminals and yet capable of an efficient "push-pull" type of transport action. These problems are solved in the invention described below. The resulting system has application in an number of different fields, including financial, residential, commercial and industrial.

SUMMARY OF THE INVENTION

Therefore, it is an object of the invention to provide a pneumatic carrier system which will operate automatically without an attendant of at least one end thereof.

It is another object of the invention to provide a pneumatic carrier system which has a carrier which does not need to be manipulated by the user.

It is another object of the invention to provide a pneumatic carrier system which will empty contents from the carrier while unattended.

It is another object of the invention to provide a pneumatic carrier system which will transport the carrier between unattended terminals according to a predetermined schedule.

It is a still further object of the invention to provide a pneumatic carrier system which includes a carrier which can be automatically reoriented for travel in different directions.

These and other objects and advantages of the invention are achieved in the preferred embodiment described below by providing a pneumatic tube carrier system comprising a first carrier receiving and sending terminal, a second carrier receiving and sending terminal, a carrier and a pneumatic tube interconnecting the first and second terminals for movement of the carrier back and forth between and into the first and second terminals and discharge means operatively associated with at least one of the first and second terminals for automatically removing contents from the carrier at the at least one terminal before returning the carrier to the other of the first and second terminals.

Preferably, the carrier comprises a tubular member having walls defining one open end to receive contents therethrough and a cover closing the open end.

According to a preferred embodiment of the invention the cover is held on the open end of the carrier in coaxial alignment therewith by magnetic attraction between the cover and the walls of the carrier defining the open end.

The discharge means preferably comprise means for removing the cover from the open end of the carrier, means for orienting the carrier to permit contents of the carrier to fall out under the influence of gravity and means for replacing the cover onto the carrier.

According to a more specific embodiment of the invention the discharge means comprise means for removing the cover from the open end of the carrier, means for inverting the carrier to permit contents of the carrier to fall out under the influence of gravity means for replacing the cover onto the carrier and means for reversing the position of the carrier to reorient the open end of the carrier with the cover thereon to define the leading end thereof during movement of the carrier to the other of the first or second terminal.

Preferably, the means for removing the cover from the carrier comprises means for holding the cover in a stationary position and means for translating the carrier laterally out of axial alignment with the cover while the cover is held in the stationary position to effect a shearing movement to overcome the magnetic attraction between the cover and the walls defining the open end of the carrier.

According to a preferred embodiment of the invention, the means for orienting the carrier comprises a tube segment within which the carrier is held against movement relative to the tube segment movement means for moving the tube segment and the carrier therein into a position to permit emptying of contents of the carrier by gravity and, after emptying, moving the tube segment and the carrier back into the starting position.

The means for inverting the carrier comprises a tube segment within which the carrier is held against movement relative to the tube segment, pivot means for pivoting the tube segment and the carrier therein about an axis intermediate the opposing ends of the carrier through an arc sufficiently greater than 90 degrees to permit emptying of contents of the carrier by gravity and, after emptying, pivoting the tube segment and the carrier back into the starting position.

According to the preferred embodiment of the invention disclosed in this application, the means for replacing the cover comprise means for translating the carrier laterally into axial alignment and physical proximity with the cover while the cover is held in the stationary position to permit magnetic attraction between the cover and the walls defining the open end of the carrier to re-establish contact therebetween, and the means for reversing the position of the carrier comprises the tube segment within which the carrier and the cover are held against movement relative to the tube segment, and the movement means for moving the tube segment and the carrier and cover therein to reorient the open end of the carrier with the cover thereon to define the leading end of the carrier.

Preferably, the other terminal includes means for removing the cover therefrom to permit placement of objects in the carrier, means for replacing the cover over the open end of the carrier and means for reversing the position of the carrier to reorient the open end of the carrier with the cover thereon to define the leading end thereof during movement of the carrier to the first of the first or second terminal.

The method according to the preferred embodiment comprises the steps of providing a first carrier receiving and sending terminal, providing a second carrier receiving and sending terminal, providing a pneumatic tube interconnecting the first and second terminals for movement of a carrier back and forth between and into the first and second terminals and providing discharge means operatively associated with at least one of the first and second terminals for automatically removing contents from the carrier at the at least one terminal before returning the carrier to the other of the first and second terminals.

The step of providing a carrier preferably comprises the step of providing a tubular member having one open end to receive contents therethrough and a cover closing the end.

The method according to the invention also includes the step of holding the cover on the open end of the carrier in coaxial alignment therewith by magnetic attraction between the cover and the walls of the carrier defining the open end.

The step of providing discharge means comprises the steps of removing the cover from the open end of the carrier, moving the carrier to permit contents of the carrier to fall out under the influence of gravity and replacing the cover onto the carrier.

The step of providing discharge means comprises the steps of removing the cover from the open end of the carrier, inverting the carrier to permit contents of the carrier to fall out under the influence of gravity, replacing the cover onto the carrier and reversing the position of the carrier to reorient the open end of the carrier with the cover thereon to define the leading end thereof during movement of the carrier to the other of the first or second terminal.

Preferably, the step of inverting the carrier comprises the steps of holding the carrier within a tube segment against movement relative to the tube segment and pivoting the tube segment and the carrier therein about an axis intermediate the opposing ends of the carrier through an arc sufficiently greater than 90 degrees to permit emptying of contents of the carrier by gravity and, after emptying, pivoting the tube segment and the carrier back into the starting position.

According to the method of preferred embodiment of the invention, the step of replacing the cover comprises the steps of translating the carrier laterally into axial alignment and physical proximity with the cover while holding the cover in the stationary position to permit magnetic attraction between the cover and the walls defining the open end of the carrier to reestablish contact therebetween; and the step of reversing the position of the carrier comprises the step of holding the carrier and the cover against movement relative to the tube segment, and pivoting the tube segment and the carrier and cover therein about an axis intermediate the opposing ends of the carrier through an arc of 180 degrees to reorient the open end of the carrier with the cover thereon to define the leading end of the carrier.

BRIEF DESCRIPTION OF THE DRAWINGS

Some of the objects of the invention have been set forth above. Other objects and advantages of the present invention will appear as the description of the invention proceeds when taken in conjunction with the following drawings, in which:

FIGS. 7–12 are fragmentary schematic views illustrating manipulation of the carrier to empty its contents;

FIG. 22 is a fragmentary top plan view of the latch mechanism of the carrier holding mechanism shown in FIGS. 20 and 21;

FIG. 23 is a side elevation view of the latch mechanism of the carrier holding mechanism;

FIG. 24 is a fragmentary top plan view of the latch mechanism of the carrier holding mechanism;

FIG. 25 is a side elevation view of the latch mechanism of the carrier holding mechanism in position to exit the inside terminal.

DESCRIPTION OF THE PREFERRED EMBODIMENT

General System Description

Figure 1:
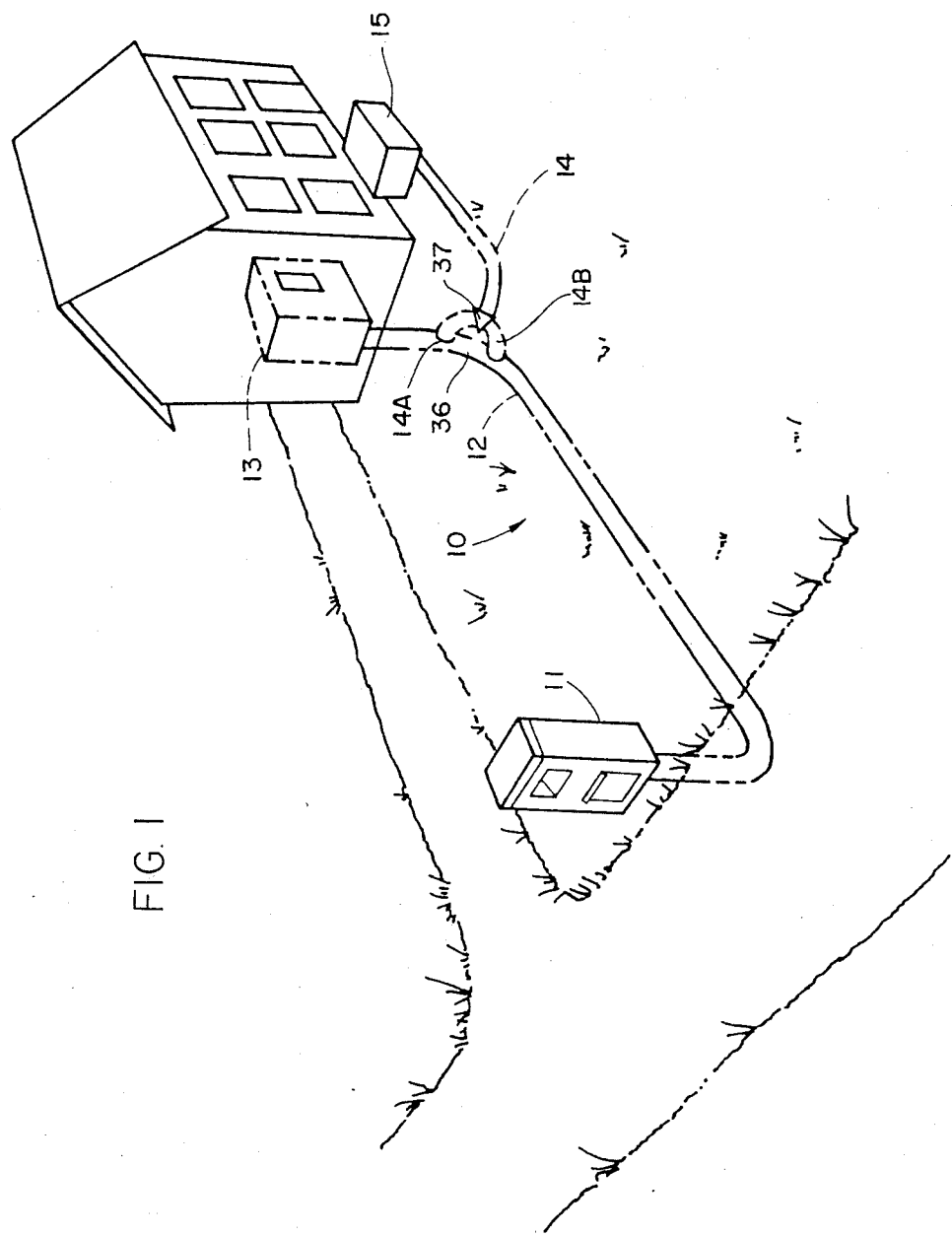
FIG. 1 is a schematic perspective view of a hypothetical system utilizing teachings of the present invention.

Referring now specifically to the drawings, a hypothetical system according to which the present invention can be practiced is illustrated in FIG. 1 and broadly designated at 10. The invention is usable in a wide variety of circumstances and environments. The environment chosen to illustrate the invention is a residential system in which incoming mail, newspapers or the like is deposited in an outside terminal 11 and delivered via a pneumatic tube 12 to an inside terminal 13. Air flow is provided to pneumatic tube 12 by a conduit 14 interconnecting pneumatic tube 11 with a blower 15. All of these components are described in detail below. However, the system described in general above is only one of several configurations which are possible using the teachings of this application.

For example, a system such as illustrated in FIG. 1 may also be used in a commercial or industrial environment for delivery of interoffice memoranda, drawings, blueprints and even assembly parts of a size limited only by the size of the carrier. Of course, the system may have a number of different terminals, all connected together in particular configurations to best suit the circumstances.

The terminology "outside" and "inside" terminal is chosen only for purposes of illustration and clarity. Of course, the terminals may be arranged in any desirable configuration with all terminals located "inside" or "outside" a structure and with the two types of terminals connected together in a wide variety of combinations and permutations. By way of illustration, a single outside terminal can be connected to a plurality of inside terminals in a linear or a spoke arrangement, or outside terminals on opposite ends of a system with one or more interposed inside terminals can be constructed. These examples in no way exhaust the configurations which are possible.

Description of Carrier

Figure 2:
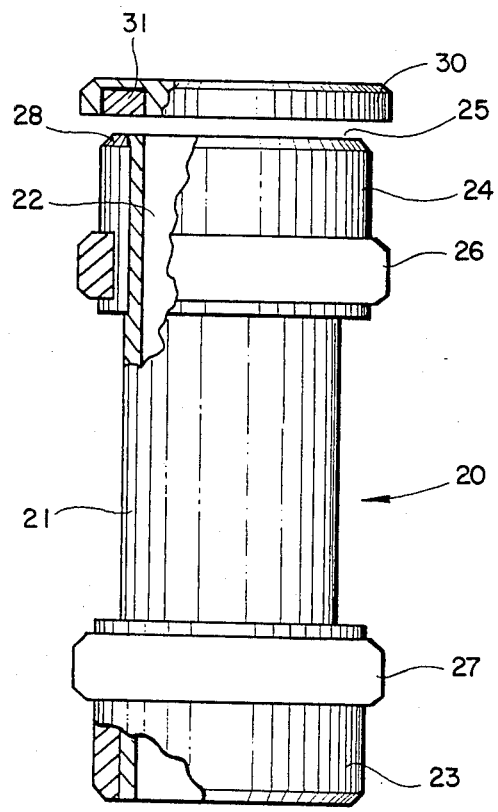
FIG. 2 is a side elevation view of a carrier according to a preferred embodiment of the invention.

A carrier 20 is transported back and forth between outside terminal 11 and inside terminal 13. Carrier 20 is illustrated in FIG. 2 and comprises a cylindrical tubular body 21 constructed of a high-impact plastic material, the walls of which define an interior chamber 22 for receiving and carrying contents, such as mail, newspapers, or other objects as the particular situation requires. A closed end, enlarged annular ring 23 encloses one end of carrier 20. An open end, enlarged annular plastic ring 24 surrounds the other end of carrier 20 and define with the adjacent end of body 21 an opening 25 through which the contents of the carrier 20 enter and exit. A thin steel ring 28 is set into the top of the axial end of ring 24. A pair of spaced-apart sealing rings 26, 27 provide a seal between carrier 20 and pneumatic tube 12 while at the same time providing a relatively low friction contact surface. It has been found that a dense felt material or a filled elastomer performs well.

Opening 25 is closed by a cover 30 and designed to be magnetically attracted to steel ring 28 by means of a series of permanent magnets 31 which are spaced at predetermined intervals around the periphery of cover 30 in axially-extending alignment with the walls of carrier body 21 and ring 28. The number and strength of the magnets required are determined empirically based upon the size and weight of carrier 20. In the present embodiment, six magnets 31 spaced equally around cover 30 have been found sufficient. However, a lesser number of elongate, arcuate-shaped magnets are also envisioned. In the embodiment disclosed herein, the body 21 has an outside diameter of 7 in. (17.8 cm.) and an inside diameter of 6¾ in. (17 cm.). The overall diameter of carrier 20 is 7⅞ in. (20 cm.) and its length is 17 in. (43 cm.). This is more than sufficient for almost any sized mail as well as a standard newspaper. Carrier 20 weighs 8 lb. (3.6 kg.) and the cover weighs ½ lb. (0.28 kg.).

Magnets 31 are each ½ in. (1.3 cm.) in length and ⅝ in. (1.6 cm.) in diameter. As noted above, six of these magnets 31 are sufficient to hold the cover 30 in place while carrier 20 is in transit and yet permit removal when required.

Cover 30 is very slightly less in diameter than rings 26,27 and has a chamfered leading edge to provide space for slight side-to-side movement within pneumatic tube 12.

Description of Carrier Propulsion System

Referring now to FIGS. 3–6, the transit of carrier 20 between terminals 11 and 13 is described. Pneumatic tube 12 is designed with an inside diameter only just large enough to permit passage of carrier 20 with a minimum of friction and yet with a seal sufficiently close to permit differential air pressure to act on carrier 20. For the dimensions of the carrier 20 described above, an inside diameter of 8 in. (20.3 cm.) is proper. Curves are radiused as required to permit carrier 20 to pass through the curve without contact between the wall of tube 12 and the leading and trailing ends of carrier 20. In FIGS. 3–6 pneumatic tube 12 connects outside terminal 11 with inside terminal 13. Valves 33,34 permit pneumatic tube 12 to be closed against air flow through its opposing ends adjacent outside and inside terminals 11,13, respectively. A sensor 36 is positioned in tube 12 intermediate terminals 11 and 13. If, as is shown in FIG. 1, blower 15 is positioned adjacent the dwelling and is thus nearer inside terminal 13, sensor 36 is likewise positioned closer to terminal 13 than terminal 11 in order to reduce the length of conduct 14. Conduit 14 divides into two conduit segments 14a,14b and interconnect with tube 12 at spaced-apart junctions on opposite sides of sensor 36. A two-way valve 37 at the junction of conduit 14 and conduit segments 14a,14b permits air to flow into and out of tube 12 through either conduit segment 14a or 14b. Blower 15 has a positive pressure port 39 and a negative pressure port 40 connected to conduit 14 by two-way valves 41,42, respectively. Valves 41,42 switch between airflow communication between conduit 14 and atmosphere as is shown.

Figure 3:
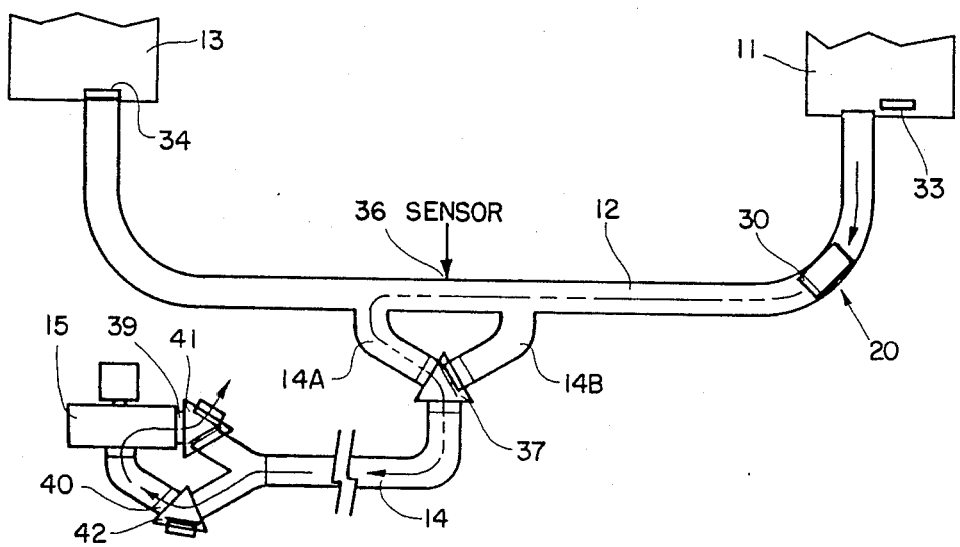
FIGS. 3–6 are side elevation schematic views illustrating operation of the pneumatic system by which the carrier is transferred from one end of the system to the other.

The operation of the system is as follows:

In FIG. 3 the carrier 20 is being transported from outside terminal 11 to inside terminal 13. As will be described below, carrier 20 is dropped into tubes 12 from within outside terminal 11. Gravity and differential air pressure therefore provide initial impetus. Valve 33 is open allowing atmospheric pressure to fill in behind carrier 20 and valve 34 is closed so that an enclosure is defined in tube 12 in advance of carrier 20. Valves 37, 41 and 42 are arranged so that blower 15 functions to discharge air under pressure to atmosphere through valve 41. Air is evacuated from tube 12 through conduit segment 14a downstream of sensor 36. Negative pressure thus created causes air entering through valve 33 to push carrier 20 towards terminal 13. Sensor 36 controls the operation of valves 37, 41 and 42 and initiates the change as carrier 20 passes sensor 36.

Figure 4:
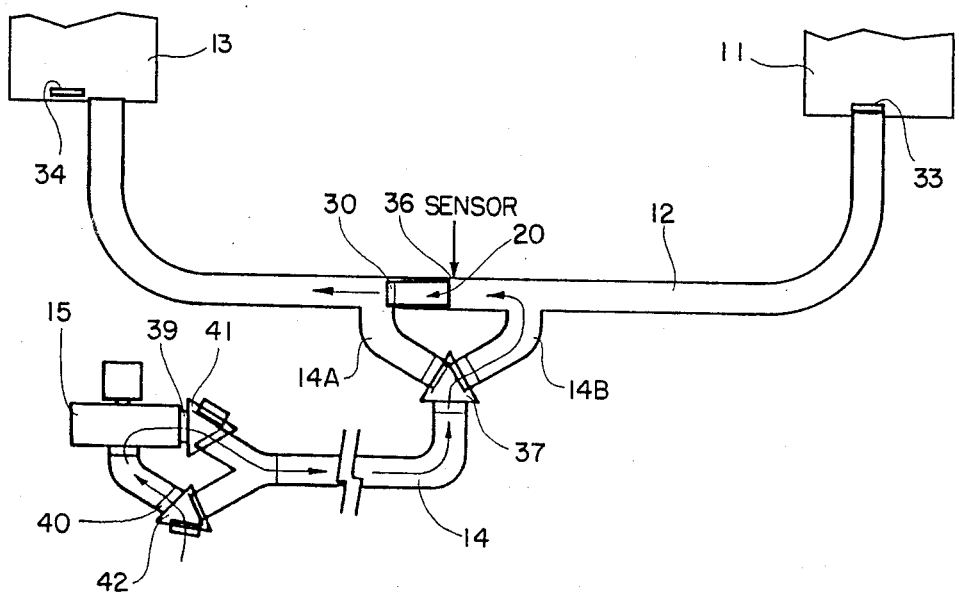

Referring to FIG. 4, valve 37 closes conduit segment 14a and opens conduit segment 14b. Valve 41 interrupts air flow from positive pressure port 39 to atmosphere and redirects pressurized air into conduit 14. Valve 42 interrupts air flow from conduit 14 into negative pressure port 40 provides atmospheric pressure to negative pressure port 40. Valve 33 closes, creating a closed chamber behind carrier 20 while valve 34 opens to permit air in front of carrier 20 to exit to atmosphere. Therefore, high pressure air delivered from blower 15 to tube 12 behind carrier 20 propels carrier 20 towards and into inside terminal 13. In effect, carrier 20 is pulled the first half of the distance to the other end of tube 12 and pushed the remaining distance.

Figure 5:
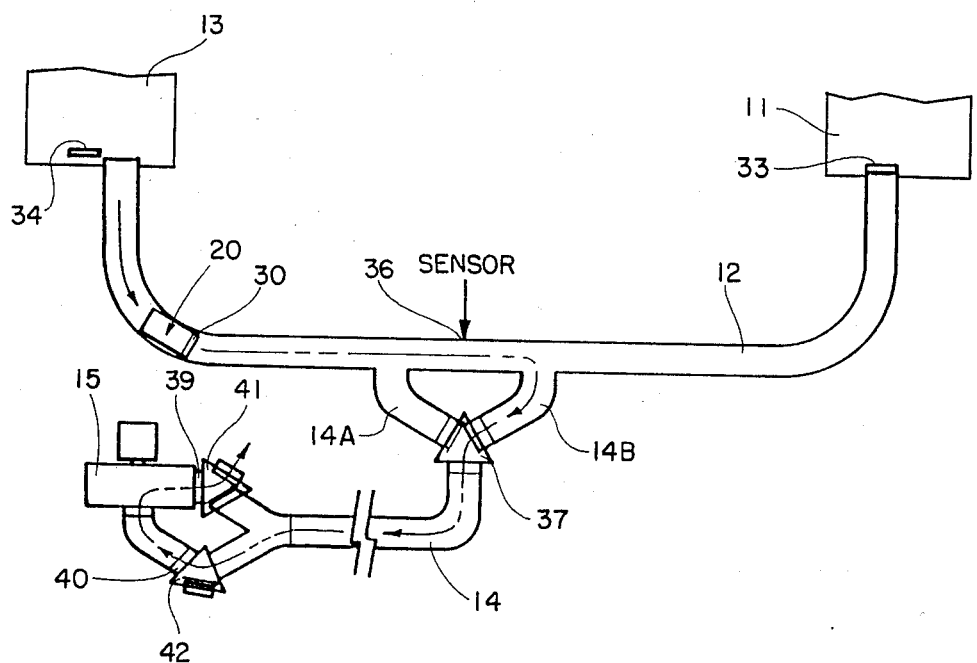
Figure 6:
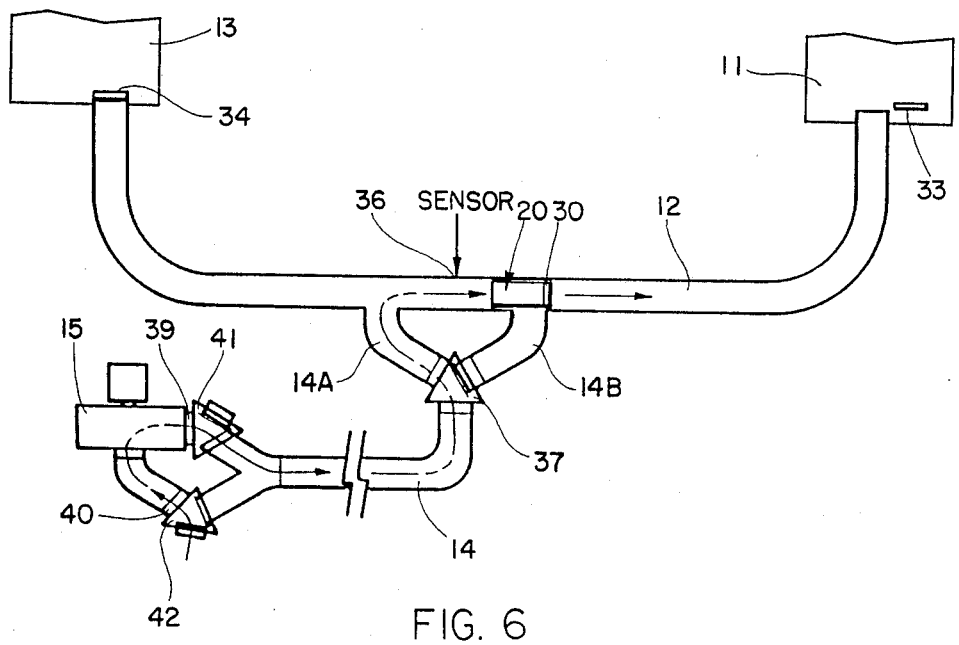

In FIGS. 5 and 6 the carrier is being transported from the inside terminal 13 to the outside terminal 11. The operation is exactly reversed from that described above. Valve 34 is open and valve 33 is closed. Air is pulled from tube 12 is advance of carrier 20 which has been dropped into tube 12 from terminal 13. Air exits tube 12 through conduit segment 14b and passes into negative pressure port 40 of blower 15, then out positive pressure port 39 to atmosphere. When sensor 36 detects passage of carrier 20, valve 33 opens and valve 34 closes. Valve 37 closes segment 14b and opens segment 14a. Pressurized air is diverted from atmosphere to conduit 14 by a valve 41 and air at atmospheric pressure enters negative pressure port 40 through valve 42. Carrier 20 is thereby propelled the remaining distance to outside terminal 11.

The arrangement described above is particularly efficient and economical. Because of the unique "pull-push" arrangement, all of the air handling can be done away from the terminals 11 and 13. This reduces noise substantially and eliminates a considerable amount of piping. In addition, the accelerating effect of gravity as the carrier drops into tube 12 on one end and the decelerating effect of gravity on the other end are effectively utilized.

General Description of Carrier Manipulation at Terminals

Manipulation of the carrier 20 at the inside terminal 13 is necessary because of the position of the cover 30 on one end of carrier 20 and because the magnetic securement of the cover 30 to carrier 20 requires that the carrier 20 always travel through pneumatic tube 12 with the cover 30 on the leading end.

For purposes of explanation the assumption is made that some object has been placed in the carrier 20 at the outside terminal 11. The carrier 20 is dispatched to the inside terminal 13 where cover 30 must first be removed. Then, the contents of carrier must be removed and the lid replaced. Finally, carrier 20 must be reoriented to that it can travel in the opposite direction back to outside terminal 11 with cover 30 on the leading end. As is shown schematically in FIGS. 7 through 18, carrier 20 is received from pneumatic tube 12 into a tube segment 50 contained within inside terminal 13. (See FIGS. 19 through 25 and below for a discussion of the detailed operation of the inside terminal 13). Carrier 20 is held in a position within tube segment 50 where cover 30 projects upwardly above the upper edge of tube segment 50 (FIG. 7). Tube segment 50 is then translated laterally out of axial alignment with tube 12, the cover 30 being "sheared" off and held in a stationary position (FIG. 8). Once clear of tube 12, tube segment 50 is pivoted about a central axis (FIG. 9). Carrier 20 with its cover 30 now removed moves with tube segment 50 and its contents fall out under the influence of gravity (FIG. 10).

After the contents have been emptied, tube segment 50 pivots back into an upright position (FIG. 11) and then translates back into axial alignment with tube 12. In so doing, carrier 20 is brought back into axial alignment with cover 30 and the magnetic attraction between the two parts causes cover 30 to be reseated on carrier 20 (FIG. 12). This completes the first phase of the carrier manipulation. If desired, the above sequence can be stopped at FIG. 11, that is, with the carrier 20 in an upright position but still laterally spaced from tube 12 and with no cover 30. In this position objects can be placed in carrier 20 while in the inside terminal 13 before being returned to the outside terminal. In either case, the movement shown in FIG. 12 completes the first phase of the carrier manipulation. However, before carrier 20 can be returned to outside terminal 11, carrier 20 must be reoriented with cover 30 in the lower position.

Figure 13:
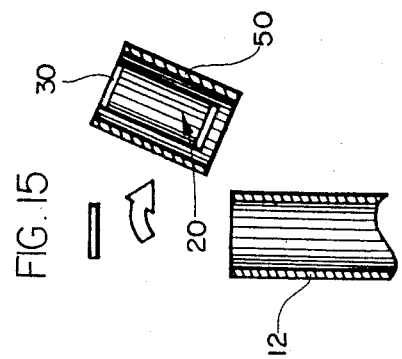
FIGS. 13–18 are fragmentary schematic views illustrating manipulation of the carrier to return it to a contents receiving terminal.
Figure 14:
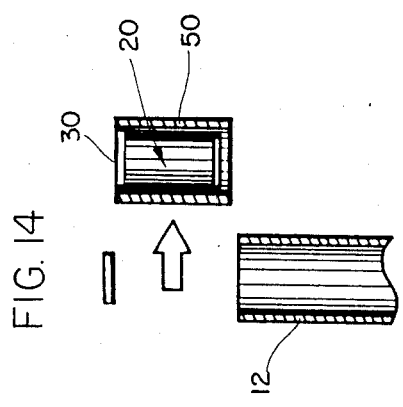
Figure 15:
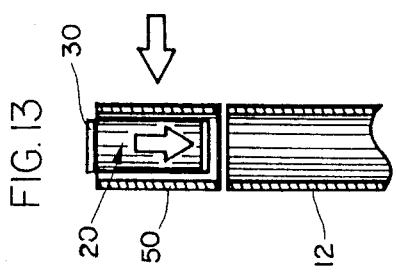
Figure 16:
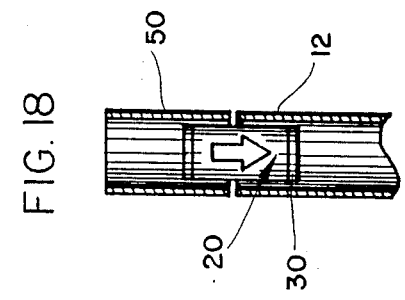
Figure 17:
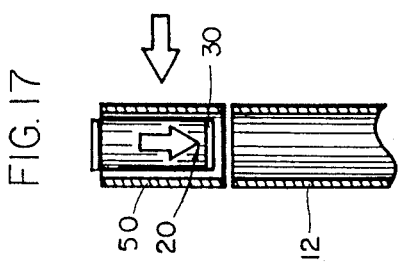
Figure 18:
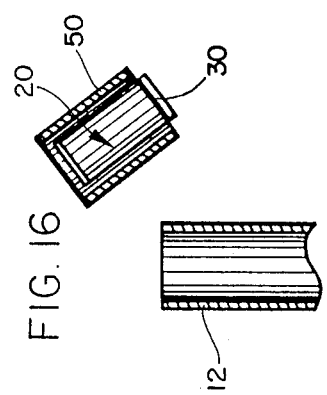

Referring now to FIG. 13, carrier 20 is lowered just enough to bring cover 30 into tube segment 50 and then held in this position. Tube segment 50 is then translated laterally out of axial alignment with tube 12 (FIG. 14) and rotated on its own axis 180 degrees to reorient carrier 20 with its cover in the downwardly facing position (FIGS. 15 and 16). Then, tube segment 50 translates laterally back into axial alignment with tube 12 (FIG. 17) and, when desired, carrier 20 is transported by pneumatic tube 12 back to the outside terminal (FIG. 18).

Outside terminal 11 operates in essentially the same manner as inside terminal 13 insofar as reorientation of the carrier 20 is concerned. Since outside terminal 11 merely opens to receive mail, etc. but does not empty contents, the sequence illustrated in FIGS. 7 through 12 are not performed. As mentioned above, however, terminals 11 and 13 may be joined in any desired combination and the terminology "inside" and "outside" are used only for illustrative purposes.

Detailed Description of Inside Terminal

Figure 19:
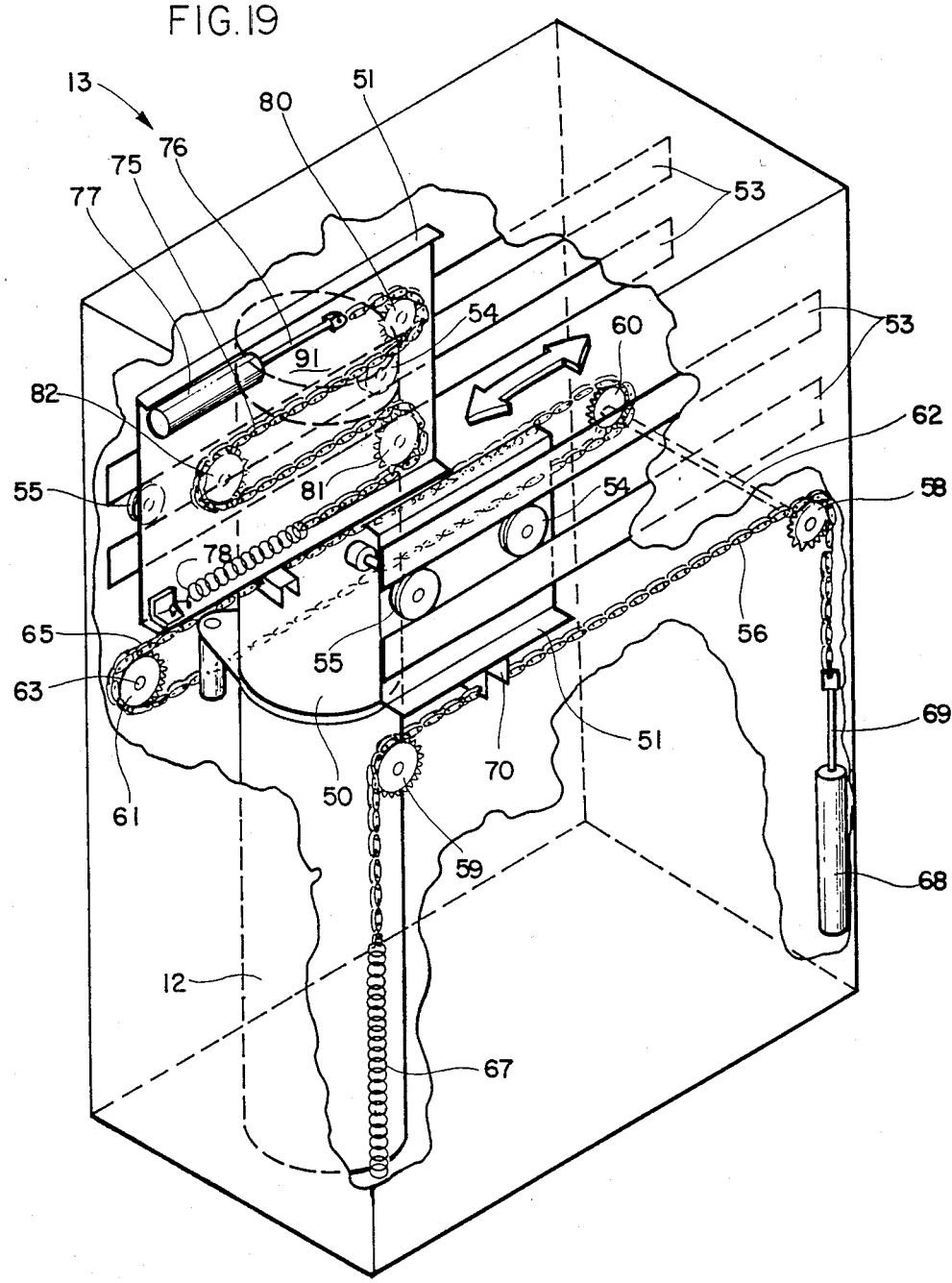
FIG. 19 is a fragmentary perspective view with parts broken away of an inside, contents emptying unit.

Referring now to FIG. 19, a overall view of the inside terminal 13 is shown. The simultaneous translation and pivoting movement described above is achieved by mounting tube segment 50 in a frame 51 mounted between two sets of vertically spaced, longitudinally extending tracks 53 by means of nylon rollers 54 and 55. Frame 51 is moved along tracks 53 by a drive chain 56 mounted on two sets of spaced apart sprockets 58,59 and 60,61. Sprockets 58 and 60 are connected by a shaft 62 and sprockets 59 and 61 are mounted on independent arbors. An driven chain 65 connects sprockets 60 and 61 for unison rotation. One end of drive chain 56 is attached to a spring 67. The other end of chain 56 is connected to an air cylinder 68 having a relatively long throw piston rod 69. Frame 51 is attached to drive chain 56 by means of a clamp 70. Activation of cylinder 68 causes piston rod 69 to retract, pulling chain 56 and causing frame 51 and tube segment 50 secured thereto to be pulled along tracks 53. To return tube segment 50 to the position in axial alignment with tube 12, cylinder 68 is deactivated and spring 67 pulls frame 51 back to aligned position.

Tube segment 50 is pivoted by a chain 75 mounted on one side of frame 51 formed of spaced-apart plates. One end of chain 75 is connected to the piston rod 76 of an air cylinder 77 mounted on frame 51 and the other end of chain 75 to a spring 78, also mounted on frame 51. Chain 75 passes around a pair of spaced-apart sprockets 80,81 mounted on frame 51 and a sprocket 82 mounted at the pivot axis of tube segment 50. Activation of cylinder 77 causes piston rod 76 to retract and tube segment 50 to pivot clockwise as viewed in FIG. 19. Any contents in carrier 20 fall into the bottom of inside terminal 13, which functions as a storage area. Preferably, this area is sufficiently large to allow accumulation of a large quantity of mail and newspapers over a period of several weeks of unattended use. Deactivation of cylinder 77 permits spring 78 to pull chain 75 in the opposite direction causing tube segment 50 to pivot counterclockwise.

Figure 20:
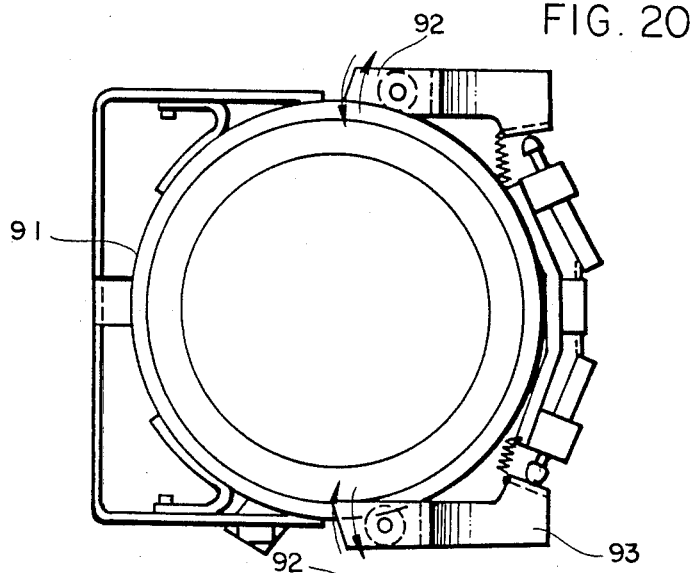
FIG. 20 is a top plan view of the carrier holding mechanism of the contents emptying unit shown in FIG. 19.
Figure 21:
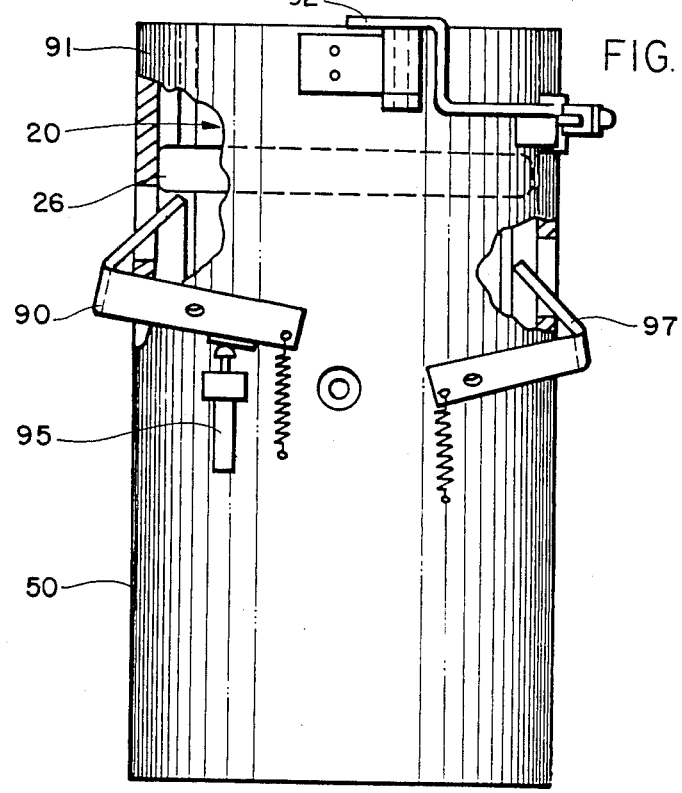
FIG. 21 is a side elevation view of the carrier holding mechanism shown in FIG. 20.

Referring now to FIGS. 20 through 25, removal and replacement of cover 30 is described in further detail. When carrier 20 enters inside terminal 13, it is held in place by a spring-loaded entry latch 90, as is best shown in FIGS. 21 and 23. As carrier 20 passes the upwardly articulated arm of latch 90, latch 90 is pushed out of the way and snaps back into position under the reduced diameter lower lip of ring 24, holding carrier 20 in the position shown in FIG. 23. Note in FIG. 23 that cover 30 is positioned above the upper edge of tube segment 50 in a stationary cap 91.

A pair of pivotally mounted latch fingers 92,93 are shown in FIGS. 20 and 22 in a normally open position to permit cover 30 to move past into cap 91. These latch fingers 92,93 are then pivoted inwardly under cover 30 and engage the underside of the lower lip of cover 30, as is shown in FIG. 24. Another pair of latches 98,99 are spring-loaded to move into a holding position across the top of the carrier 20 and below the now-removed cover 30. Then, tube segment 50 is translated laterally out of alignment with tube 12. Cover is pushed off of the top of carrier 20 by this lateral movement and is held suspended in cap 91 by latch fingers 92,93. (See also FIGS. 7 and 8). As tube segment 50 and carrier 20 therein are inverted to empty the contents, latches 98,99 prevent carrier 20 from falling out of tube segment. When carrier is moved back into axial alignment with tube 12, latch fingers 92,93 and latches 98,99 retract and cover 30 is reseated on carrier 20 by magnetic attraction. Retraction of latches 98,99 occurs as tube segment moves back into alignment with cap 91, the latches 98,99 being curved sufficiently in the axial direction to be engaged by tube segment 50 itself. (See also FIG. 12). Now carrier 20 is ready to be reoriented with cover 30 in the downwardly facing direction. Latch 90 is retracted by the upward push of a small air cylinder 95 (compare FIGS. 23 and 25). Carrier 20 drops a short distance and is caught by a return latch 97, which also catches under the lip of ring 24 in the manner described above. Note that the cover 30 is now below the level of cap 91 and within tube segment 50. Latch fingers 92,93 now move inwardly again, this time over the top of cover 30. Therefore, when carrier 20 is inverted (see FIGS. 16 and 17) it is held in position by latch fingers 92,93 until carrier 20 is sent back to outside terminal 11, at which time latch fingers 92,93 are retracted and carrier falls under its own weight down pneumatic tube 12.

Detailed Description of Outside Terminal

Figure 26:
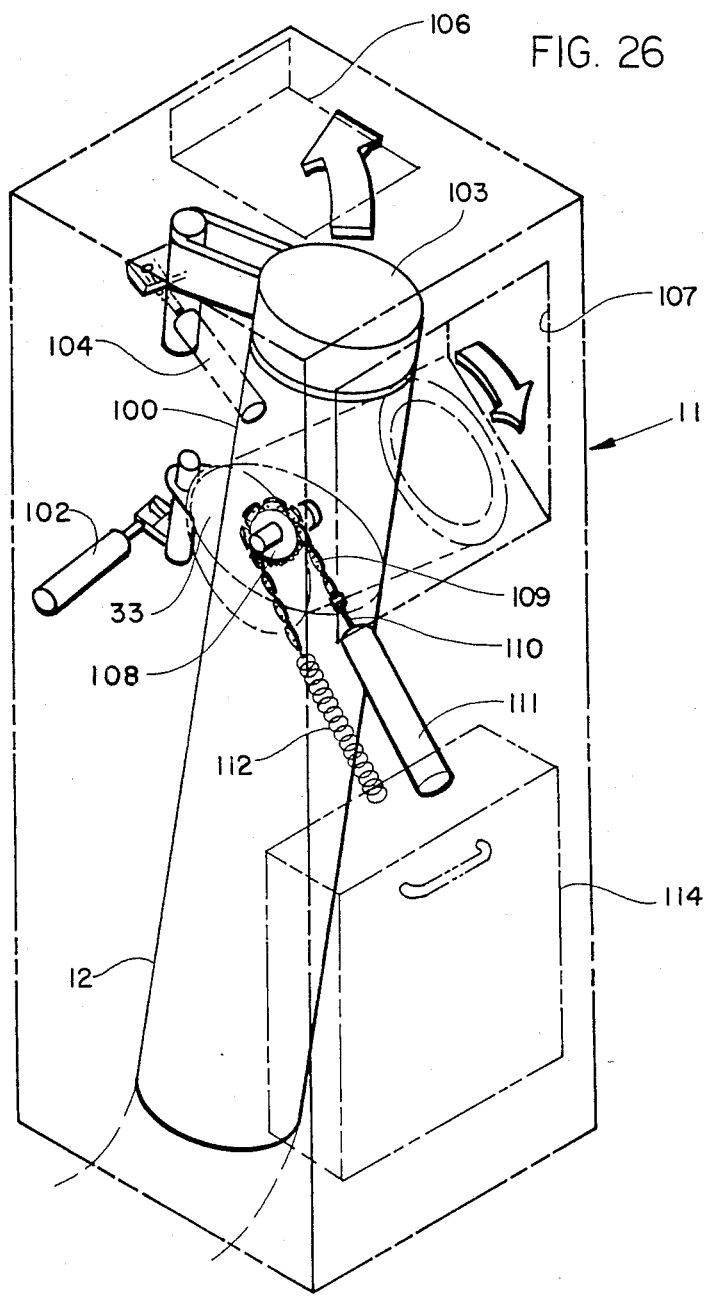
FIG. 26 is a fragmentary perspective view with parts broken away of the outside terminal according to the present invention

Referring now to FIG. 26, the outside terminal 11 is shown in further detail. Pneumatic tube 12 terminates at a slight tilt and delivers carrier 20 into a tube segment 100 normally positioned in axial alignment with tube 12. Carrier 20 is held in position in tube segment 100 by latches which move into position in exactly the same manner as do latches 90 and 91 in the inside terminal (See FIGS. 21 and 25). Cover 30 is positioned within a cap 103 which is then pivoted away from axial alignment with tube segment 100 by an air cylinder 104 in the manner shown in FIG. 26. Air cylinder 102 rotates plate valve 33 to open and close tube 12. The cover 30 is held within cap 103 by means of a plate 106 over which the cap 103 moves. This exposes the open end of carrier 20. When desired, mail, newspapers, etc. can be placed into carrier 20 through access door 107 positioned on the front surface of outside terminal 11.

Before delivery of carrier 20 back to inside terminal 13, cover 30 is placed on top of carrier 20 by swinging cap 103 back into axial alignment with tube segment 100. As with inside terminal 13, carrier 20 must be reoriented so that the end of carrier 20 having cover 30 leads. This is accomplished by pivotally mounting tube segment 100 midway between its opposing ends and mounting a sprocket 108 to the pivot. A chain 109 engages dsprocket 108 and is connected on one end to a piston rod 110 of an air cylinder 111. The other end of chain 109 is attached to a spring 112. Activation of air cylinder 111 rotates tube segment 100 clockwise 180 degrees so that cover end of carrier 20 is directed downwardly into tube 12. At the appropriate time, carrier 20 is dropped into tube 12 and is transported through tube 12 to inside terminal 13, as described above.

Outside terminal 11 is provided with a large compartment 114 for storage of items too large to fit into carrier 20. This may be used by the occupant to leave oversized items for pick-up, or by a mail carrier or delivery person to leave oversized items for later collection by the occupant.

The pneumatic and electrical controls, including relays, microswitches, sensors and logic boards are in and of themselves conventional and do not require detailed explanation to one of ordinary skill in the art. The operational logic is described above and, as noted, is subject to variation within the scope of the invention. Design of necessary control components is a function of the particular combination of terminal types, numbers and configurations chosen for a given application, in addition to the particular way in which the carrier 20 will be transported between terminals, i.e., the incorporation of delay features and the like into the apparatus and method described above.

A method and apparatus for automatic transfer of a carrier between terminals is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A pneumatic tube carrier system comprising:
(a) a first carrier receiving and sending terminal;
(b) a second carrier receiving and sending terminal;

(c) a carrier having an open end for receiving contents therethrough and a cover closing said open end;

(d) a pneumatic tube interconnecting said first and second terminals for movement of the carrier back and forth between and into said first and second terminals; and (e) discharge means operatively associated with at least one of said first and second terminals for automatically removing contents from the carrier at said at least one terminal before returning the carrier to the other of said first and second terminals, said discharge means comprising:

(i) means for removing the cover from the open end of the carrier;

(ii) means for orienting the carrier to permit contents of the carrier to be discharged;

(iii) means for replacing the cover onto the carrier; and (iv) means for reversing the position of the carrier to reorient the open end of the carrier with the cover thereon to define the leading end thereof during movement of the carrier to the other of the first or second terminal.

2. A pneumatic tube carrier system according to claim 1, wherein said cover is held on the open end of the carrier in coaxial alignment therewith by magnetic attraction between the cover and the walls of the carrier defining the open end.

3. A pneumatic tube carrier system according to claim 2, wherein the means for orienting the carrier comprises:

(a) a tube segment within which the carrier is held against movement relative to the tube segment;

(b) movement means for moving the tube segment and the carrier therein into a position to permit emptying of contents of the carrier by gravity and, after emptying, moving the tube segment and the carrier back into the starting position.

4. A pneumatic tube carrier system according to claim 2, wherein the means for removing the cover from the carrier comprises:

(a) means for holding the cover in a stationary position; and (b) means for translating the carrier laterally out of axial alignment with the cover while the cover is held in the stationary position to effect a shearing movement to overcome the magnetic attraction between the cover and the walls defining the open end of the carrier.

5. A pneumatic tube carrier system according to claim 1 or 2, wherein said orienting means is means for inverting the carrier to permit contents of the carrier to fall out under the influence of gravity.

6. A pneumatic tube carrier system according to claim 5, wherein the means for inverting the carrier comprises:

(a) a tube segment within which the carrier is held against movement relative to the tube segment;

(b) pivot means for pivoting the tube segment and the carrier therein about an axis intermediate the opposing ends of the carrier through an arc sufficiently greater than 90 degrees to permit emptying of contents of the carrier by gravity and, after emptying, pivoting the tube segment and the carrier back into the starting position.

7. A pneumatic tube carrier system according to claim 5, wherein said means for replacing the cover comprise means for translating the carrier laterally into axial alignment and physical proximity with the cover while the cover is held in the stationary position to permit magnetic attraction between the cover and the walls defining the open end of the carrier to re-establish contact therebetween; and said means for reversing the position of the carrier comprises said tube segment within which the carrier and the cover are held, and said movement means for moving the tube segment and the carrier and cover therein to reorient the open end of the carrier with the cover thereon to define the leading end of the carrier.

8. A pneumatic tube carrier system according to claim 5, wherein said means for replacing the cover comprise means for translating the carrier laterally into axial alignment and physical proximity with the cover while the cover is held in the stationary position to permit magnetic attraction between the cover and the walls defining the open end of the carrier to re-establish contact therebetween; and said means for reversing the position of the carrier comprises said tube segment within which the carrier and the cover are held against movement relative to the tube segment, and said pivot means for pivoting the tube segment and the carrier and cover therein about an axis intermediate the opposing ends of the carrier through an arc of 180 degrees to reorient the open end of the carrier with the cover thereon to define the leading end of the carrier.

9. A pneumatic tube carrier system according to claim 1,2,3,6, or 7 wherein said other terminal includes means for removing the cover therefrom to permit placement of objects in the carrier, means for replacing the cover over the open end of the carrier and means for reversing the position of the carrier to reorient the open end of the carrier with the cover thereon to define the leading end thereof during movement of the carrier to the first of the first or second terminal.

10. A pneumatic tube carrier system according to claim 1,2,3,6, or 7 and including storage means for accumulating contents discharged from the carrier.

11. A pneumatic tube carrier system comprising:

(a) a first carrier receiving and sending terminal;

(b) a second carrier receiving and sending terminal;

(c) a carrier having a tubular member having walls defining one open end to receive contents therethrough and a cover closing said open end, said cover being held on the open end of the carrier in coaxial alignment therewith by magnetic attraction between the cover and the walls of the carrier defining the open end;

(d) a pneumatic tube interconnecting said first and second terminals for movement of the carrier back and forth between and into said first and second terminals; and (e) discharge means operatively associated with at least one of said first and second terminals for automatically removing contents from the carrier at said at least one terminal before returning the carrier to the other of said first and second terminals, said discharge means comprising:

(i) means for holding the cover in a stationary position;

(ii) means for translating the carrier laterally out of axial alignment with the cover while the cover is held in the stationary position to effect a shearing movement to overcome the magnetic attraction between the cover and the walls defining the open end of the carrier;
- (iii) means for orienting the carrier to permit contents of the carrier to fall out under the influence of gravity; and
- (iv) means for replacing the cover onto the carrier.

12. A method of cycling a pneumatic tube carrier between first and second terminals, wherein the carrier has an open end for receiving contents therethrough and a cover closing the open end, said method comprising the steps of:
- (a) providing a first carrier receiving and sending terminal;
- (b) providing a second carrier receiving and sending terminal;
- (c) providing a pneumatic tube interconnecting said first and second terminals for movement of a carrier back and forth between and into said first and second terminals; and
- (d) providing discharge means operatively associated with at least one of said first and second terminals for automatically removing contents from the carrier at said at least one terminal before returning the carrier to the other of said first and second terminals, said step of providing discharge means comprises the steps of:
  - (i) removing the cover from the open end of the carrier;
  - (ii) orienting the carrier to permit discharge of contents therefrom;
  - (iii) replacing the cover onto the carrier; and
  - (iv) reversing the position of the carrier to reorient the open end of the carrier with the cover thereon to define the leading end thereof during movement of the carrier to the other of the first or second terminal.

13. A method according to claim 12, and including the step of holding the cover on the open end of the carrier in coaxial alignment therewith by magnetic attraction between the cover and the walls of the carrier defining the open end.

14. A method according to claim 12, wherein the step of orienting comprises
inverting the carrier to permit contents of the carrier to fall out under the influence of gravity.

15. A method according to claim 14, wherein the step of inverting the carrier comprises the steps of:
- (a) holding the carrier within a tube segment against movement relative to the tube segment; and
- (b) pivoting the tube segment and the carrier therein about an axis intermediate the opposing ends of the carrier through an arc sufficiently greater than 90 degrees to permit emptying of contents of the carrier by gravity and, after emptying, pivoting the tube segment and the carrier back into the starting position.

16. A method according to claim 12 or 14, wherein the step of replacing the cover comprises the steps of translating the carrier laterally into axial alignment and physical proximity with the cover while holding the cover in the stationary position to permit magnetic attraction between the cover and the walls defining the open end of the carrier to re-establish contact therebetween; and said step of reversing the position of the carrier comprises the step of holding the carrier and the cover against movement relative to the tube segment, and pivoting the tube segment and the carrier and cover therein about an axis intermediate the opposing ends of the carrier through an arc of 180 degrees to reorient the open end of the carrier with the cover thereon to define the leading end of the carrier.

17. A method according to claim 12, and including the steps of, when the carrier is at rest within the other of said first and second terminals, removing the cover therefrom to permit placement of objects in the carrier, replacing the cover over the open end of the carrier and reversing the position of the carrier to reorient the open end of the carrier with the cover thereon to define the leading end thereof during movement of the carrier to the first of the first or second terminal.

18. A method according to claim 12 and including the step of accumulating contents discharged from the carrier.

* * * * *

UNITED STATES PATENT AND TRADEMARK OFFICE
CERTIFICATE OF CORRECTION

PATENT NO. : 4,820,086

DATED : April 11, 1989

INVENTOR(S) : John P. Kieronski

It is certified that error appears in the above-identified patent and that said Letters Patent is hereby corrected as shown below:

On the title page, delete the original ABSTRACT and substitute the following ABSTRACT:

-- A pneumatic tube carrier system having a first carrier receiving and sending terminal and a second carrier receiving and sending terminal. A carrier having an open end and a cover closing the open end is transported back and forth between the terminals through a pneumatic tube interconnecting the first and second terminals. The cover is removed at the terminals and the carrier is oriented for emptying. The cover is then replaced and the carrier reversed to reorient the covered open end as the leading end during return of the carrier to the other terminal. The cover is held on the carrier by magnetic attraction and is removed by a shearing of the carrier from the cover. --

Column 7, Line 25, delete "is" and insert therefor -- in -- .

Column 10, Line 29, delete "dsprocket" and insert therefor -- sprocket --.

Column 10, Line 32, delete "180" (in boldface type), and insert therefor -- 180 -- (in non-bolface type).

Signed and Sealed this

Twenty-eighth Day of July, 1992

Attest:

DOUGLAS B. COMER

*Attesting Officer*  *Acting Commissioner of Patents and Trademarks*